(12) United States Patent
Taylor et al.

(10) Patent No.: US 10,657,381 B2
(45) Date of Patent: May 19, 2020

(54) SYSTEMS AND METHODS FOR SHARING CONTENT

(71) Applicant: Facebook, Inc., Menlo Park, CA (US)

(72) Inventors: Andrew James Taylor, Kingsville (AU); Joshua Barton Dickens, Oakland, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/265,683

(22) Filed: Feb. 1, 2019

(65) Prior Publication Data

US 2019/0188483 A1 Jun. 20, 2019

Related U.S. Application Data

(63) Continuation of application No. 15/846,099, filed on Dec. 18, 2017, now Pat. No. 10,223,593.

(51) Int. Cl.
| | | |
|---|---|---|
| *H04N 5/783* | (2006.01) |
| *G06K 9/00* | (2006.01) |
| *H04N 19/42* | (2014.01) |
| *G10L 15/02* | (2006.01) |
| *G06Q 50/00* | (2012.01) |
| *H04N 5/917* | (2006.01) |
| *G10L 25/78* | (2013.01) |

(52) U.S. Cl.
CPC ..... *G06K 9/00744* (2013.01); *G06K 9/00677* (2013.01); *G06Q 50/01* (2013.01); *G10L 15/02* (2013.01); *H04N 19/42* (2014.11); *G10L 25/78* (2013.01)

(58) Field of Classification Search
CPC .... G06K 9/00744; G06Q 50/01; G10L 15/02; H04N 19/42
USPC .......................... 386/326, 328, 329, 335, 278
See application file for complete search history.

(56) References Cited

U.S. PATENT DOCUMENTS

| | | |
|---|---|---|
| 2012/0148216 A1 | 6/2012 | Pavagada |
| 2013/0129308 A1 | 5/2013 | Kam |
| 2014/0032718 A1 | 1/2014 | Berger |
| 2015/0350704 A1* | 12/2015 | Horen ..................... G06F 16/40 725/95 |

\* cited by examiner

*Primary Examiner* — Robert Chevalier
(74) *Attorney, Agent, or Firm* — Sheppard Mullin Richter & Hampton LLP

(57) ABSTRACT

Systems, methods, and non-transitory computer-readable media can determine a video being posted through a social networking system; one or more portions of the video to be compressed are determined; and the one or more portions of the video are compressed, wherein, upon being compressed, at least one frame corresponding to at least one of the portions is deleted.

20 Claims, 9 Drawing Sheets

SYSTEMS AND METHODS FOR SHARING CONTENT

CROSS-REFERENCE TO RELATED APPLICATIONS

This application is a continuation of U.S. patent application Ser. No. 15/846,099, filed on Dec. 18, 2017 and entitled "SYSTEMS AND METHODS FOR SHARING CONTENT", which is incorporated herein by reference in its entirety.

FIELD OF THE INVENTION

The present technology relates to the field of content sharing. More particularly, the present technology relates to techniques for sharing content.

BACKGROUND

Users often utilize computing devices for a wide variety of purposes. Users can use their computing devices to, for example, interact with one another, access media content items, share media content items, and create media content items. In some cases, media content items can be provided by members of a social networking system. The media content items can include one or a combination of text, images, videos, and audio. The media content items may be published to the social networking system for consumption by others.

Under conventional approaches, users may post various media content items to a social networking system. In general, media content items posted by a first user can be included in the respective content feeds of other users of the social networking system, for example, that have "followed" the first user. By following (or subscribing to) the first user, some or all content that is produced, or posted, by the first user may be included in the respective content feeds of the following users. A user following the first user can simply unfollow the first user to prevent new content that is produced by the first user from being included in the following user's content feed.

SUMMARY

Various embodiments of the present disclosure can include systems, methods, and non-transitory computer readable media configured to determine a video being posted through a social networking system; one or more portions of the video to be compressed are determined; and the one or more portions of the video are compressed, wherein, upon being compressed, at least one frame corresponding to at least one of the portions is deleted.

In some embodiments, wherein, upon being compressed, a respective length of time corresponding to each of the one or more portions is reduced.

In some embodiments, the systems, methods, and non-transitory computer readable media are configured to determine one or more portions of the video that contain audio determined to be human speech and designate one or more remaining portions of the video for compression.

In some embodiments, the systems, methods, and non-transitory computer readable media are configured to determine one or more portions of the video that contain subject matter representing one or more pre-defined objects and designate one or more remaining portions of the video for compression.

In some embodiments, the pre-defined objects include human faces, individuals, activities, products, logos, animals, points of interest, or other concepts.

In some embodiments, the systems, methods, and non-transitory computer readable media are configured to determine at least one portion of the video in which at least one virtual sticker was inserted and designate one or more remaining portions of the video for compression.

In some embodiments, the systems, methods, and non-transitory computer readable media are configured to determine at least one portion of the video in which at least one virtual sticker was inserted and designate the portion of the video for compression.

In some embodiments, the systems, methods, and non-transitory computer readable media are configured to determine at least one portion of the video during which a threshold angular movement was detected and designate the portion of the video for compression.

In some embodiments, the systems, methods, and non-transitory computer readable media are configured to delete at least one frame from each of the one or more portions of the video.

In some embodiments, the systems, methods, and non-transitory computer readable media are configured to determine a set of frames in the video based at least in part on a user selection.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
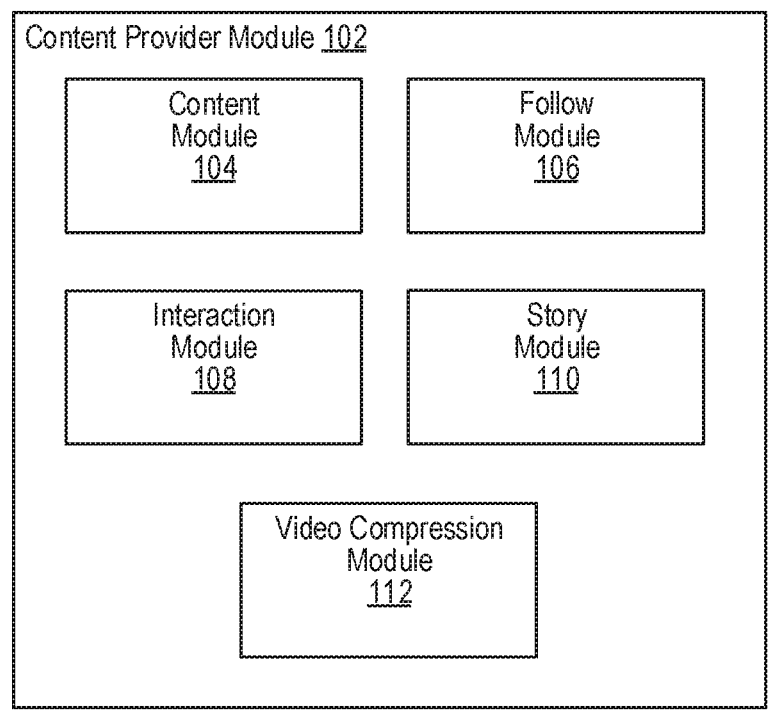
FIG. 1 illustrates an example system including an example content provider module, according to an embodiment of the present disclosure.
Figure 1:
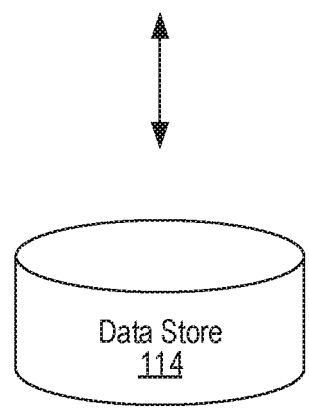

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Sharing Content

Users often utilize computing devices for a wide variety of purposes. Users can use their computing devices to, for example, interact with one another, access media content items, share media content items, and create media content items. In some cases, media content items can be provided by members of a social networking system. The media content items can include one or a combination of text, images, videos, and audio. The media content items may be published to the social networking system for consumption by others.

Under conventional approaches, users may post various media content items to the social networking system. In general, media content items posted by a first user can be included in the respective content feeds of other users of the social networking system that have "followed" the first user. By following (or subscribing to) the first user, some or all content that is produced, or posted, by the first user may be included in the respective content feeds of the users following the first user. A user following the first user can prevent new content from the first user from being included in the user's content feed by simply "unfollowing" the first user.

In some instances, users may want to compress (or condense) video content being posted through the social networking system. For example, a user may want to compress some portions of a given video to emphasize other, more interesting portions of the video. In another example, a user may want to compress less interesting portions of a video to accommodate a length-based limit. For example, in some embodiments, the social networking system may restrict videos to be between 3 to 15 seconds in length. In this example, a user posting a video having a length of 20 seconds will need to trim the video length before being able to share the video through the social networking system. Conventional approaches typically do not permit users to selectively compress portions of videos. Accordingly, such conventional approaches may not be effective in addressing these and other problems arising in computer technology.

An improved approach rooted in computer technology overcomes the foregoing and other disadvantages associated with conventional approaches specifically arising in the realm of computer technology. For example, in some embodiments, a video being posted through a social networking system can be determined; one or more portions of the video to be compressed can be determined; and the one or more portions of the video can be compressed, wherein, upon being compressed, at least one frame corresponding to at least one of the portions is deleted. More details relating to the disclosed technology are provided below.

FIG. 1 illustrates an example system 100 including an example content provider module 102, according to an embodiment of the present disclosure. As shown in the example of FIG. 1, the content provider module 102 can include a content module 104, a follow module 106, an interaction module 108, a story module 110, and a video compression module 112. In some instances, the example system 100 can include at least one data store 114. The components (e.g., modules, elements, etc.) shown in this figure and all figures herein are exemplary only, and other implementations may include additional, fewer, integrated, or different components. Some components may not be shown so as not to obscure relevant details.

In some embodiments, the content provider module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the content provider module 102 or at least a portion thereof can be implemented using one or more computing devices or systems that include one or more servers, such as network servers or cloud servers. In some instances, the content provider module 102 can, in part or in whole, be implemented within or configured to operate in conjunction with a social networking system (or service), such as the social networking system 630 of FIG. 6. In some instances, the content provider module 102 can be, in part or in whole, implemented within or configured to operate in conjunction or be integrated with a client computing device, such as the user device 610 of FIG. 6. For example, the content provider module 102 can be implemented as or within a dedicated application (e.g., app), a program, or an applet running on a user computing device or client computing system. The application incorporating or implementing instructions for performing some, or all, functionality of the content provider module 102 can be created by a developer. The application can be provided to or maintained in a repository. In some cases, the application can be uploaded or otherwise transmitted over a network (e.g., Internet) to the repository. For example, a computing system (e.g., server) associated with or under control of the developer of the application can provide or transmit the application to the repository. The repository can include, for example, an "app" store in which the application can be maintained for access or download by a user. In response to a command by the user to download the application, the application can be provided or otherwise transmitted over a network from the repository to a computing device associated with the user. For example, a computing system (e.g., server) associated with or under control of an administrator of the repository can cause or permit the application to be transmitted to the computing device of the user so that the user can install and run the application. The developer of the application and the administrator of the repository can be different entities in some cases, but can be the same entity in other cases. It should be understood that many variations are possible.

The content provider module 102 can be configured to communicate and/or operate with the at least one data store 114, as shown in the example system 100. The at least one data store 114 can be configured to store and maintain various types of data. For example, the data store 114 can store information describing various content that has been posted by users of a social networking system. In some implementations, the at least one data store 114 can store information associated with the social networking system (e.g., the social networking system 630 of FIG. 6). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 114 can store information associated with users, such as user identifiers, user information, profile information, user specified settings, content produced or posted by users, and various other types of user data.

The content module 104 can be configured to provide users with access to content (e.g., media content items) that is available through a social networking system. In some instances, this content can include media content items that are posted in content feeds accessible through the social networking system. For example, the content module 104 can provide a first user with access to media content items through an interface that is provided by a software application (e.g., a social networking application) running on a computing device of the first user. The first user can also interact with the interface to post media content items to the social networking system. Such media content items may include text, images, audio, and videos, for example. For example, the first user can submit a post to be published through the social networking system. In some embodiments, the post can include, or reference, one or more media content items.

In various embodiments, other users of the social networking system can access media content items posted by the first user. In one example, the other users can access the media content items by searching for the first user by user name through an interface provided by a software application (e.g., a social networking application, browser, etc.) running on their respective computing devices. In some instances, some users may want to see media content items posted by the first user in their respective content feed. To cause media content items posted by the first user to be included in their respective content feed, a user can select an option through the interface to subscribe to, or "follow", the first user. The follow module 106 can process the user's request by identifying the user as a follower of (or "friend" of) the first user in the social networking system. As a result, some or all media content items that are posted by the first user can automatically be included in the respective content feed of the user. If the user decides that they no longer want to see content from the first user in their respective content feed, the user can select an option through the interface to unsubscribe from, or "unfollow", the first user. As a result, the follow module 106 can remove the association between the user and the first user so that media content items posted by the first user are no longer included in the content feed of the user.

In some instances, users may want to interact with posted media content items. For example, a user may want to endorse, or "like", a media content item. In this example, the user can select an option provided in the interface to like the desired media content item. The interaction module 108 can determine when a user likes a given media content item and can store information describing this relationship. The interaction module 108 can also determine when other forms of user interaction are performed and can store information describing the interaction (e.g., information describing the type of interaction, the identity of the user, the identity of the user that posted the media content item, and the media content item, to name some examples). For example, the user may want to post a comment in response to a media content item. In this example, the user can select an option provided in the interface to enter and post the comment for the desired media content item. The interaction module 108 can determine when a user posts a comment in response to a given media content item and can store information describing this relationship. Other forms of user interaction can include emoji-based reactions to a media content item (e.g., happy, sad, angry, etc.) and re-sharing a media content item, for example.

In some embodiments, the story module 110 can provide an option that allows users to post their content as stories. In such embodiments, each user has a corresponding story (or story feed) in which the user can post content. When a user's story is accessed by another user, the story module 110 can provide content posted in the story to the other user for viewing. In general, content posted in a user's story may be accessible by any user of the social networking system. In some embodiments, content posted in a user's story may only be accessible to followers of the user. In some embodiments, user stories expire after a pre-defined time interval (e.g., every 24 hours). In such embodiments, content posted in stories is treated as ephemeral content that is made inaccessible once the pre-defined time interval has elapsed. In contrast, content posted in a user (or follower) content feed can be treated as non-ephemeral content that remains accessible for an indefinite period of time.

In various embodiments, the video compression module 112 is configured to compress portions of media content items based on various techniques. More details regarding the video compression module 112 will be provided below with reference to FIG. 2.

Figure 2:
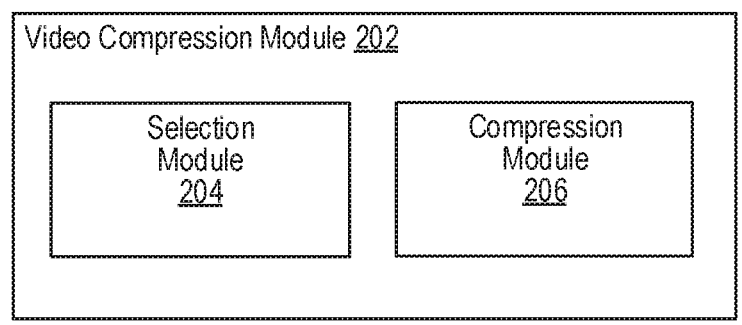
FIG. 2 illustrates an example video compression module, according to an embodiment of the present disclosure.

FIG. 2 illustrates a video compression module 202, according to an embodiment of the present disclosure. In some embodiments, the video compression module 112 of FIG. 1 can be implemented with the video compression module 202. As shown in the example of FIG. 2, the video compression module 202 can include a selection module 204 and a compression module 206.

The selection module 204 can provide options for selecting (or identifying) portions of media content items to be compressed. For example, a user can identify a set of frames of a video that capture subject matter to be preserved. In this example, frames of the video that are not included in the identified set of frames can be compressed using various approaches described herein. In some embodiments, a user may identify portions of a video that need not be preserved. For example, a video capturing a person's reaction may include unnecessary (or uninteresting) footage that precedes the reaction. In this example, the user may opt to compress some of the preceding footage so that portions of the video corresponding to the person's reaction are emphasized. In various embodiments, portions of a video to be compressed (or not to be compressed) can be identified automatically using various approaches described herein. More details regarding the selection module 204 will be provided below with reference to FIG. 3.

The compression module 206 can compress selected (or designated) portions of videos. In some embodiments, portions of a video can be compressed to accommodate a length-based restriction. For example, a user may want to reduce an overall length of a video from 30 seconds to 15 seconds. In this example, respective lengths of any portions of the video that were selected for compression can be reduced to satisfy the length-based restriction. In some embodiments, portions of a video can be compressed to emphasize (or highlight) other portions of the video. Many variations are possible.

In some embodiments, portions of a video can be defined based on time. For example, a portion may correspond to video footage that spans from second 6 (e.g., 00:00:06) to second 14 (e.g., 00:00:14) of the video. In such embodiments, the compression module 206 can compress a portion of a video by reducing its overall length (or duration). For example, a portion to be compressed may originally be 8 seconds in length. Once compression is applied, the length of the portion may be reduced to 4 seconds, for example. In some embodiments, such compression may be performed by adjusting a playback speed corresponding to a given portion. In some embodiments, the compression may be performed by selectively deleting (or dropping) frames corresponding to a given portion.

In some embodiments, portions of a video can be defined based on frames. For example, a portion may correspond to video footage that spans from a first frame (e.g., frame 15) to a second frame (e.g., frame 45) of the video. In another example, a portion may be defined by a fixed count of frames (e.g., 30 frames). In such embodiments, a portion of a video can be compressed by selectively deleting (or dropping) frames that correspond to that portion of the video. For example, a portion spanning from a frame 15 to a frame 45 of a video has a total of 30 frames. When compressing the portion, in some embodiments, the compression module 206 can selectively drop every other frame that corresponds to the portion. As a result, the total number of frames corresponding to the portion can be reduced from 30 frames to 15 frames. In some embodiments, the compression module 206 can selectively drop every nth frame of a video portion with n being some positive number (e.g., every third frame, every twentieth frame, etc.). Naturally, many variations are possible.

Figure 3:
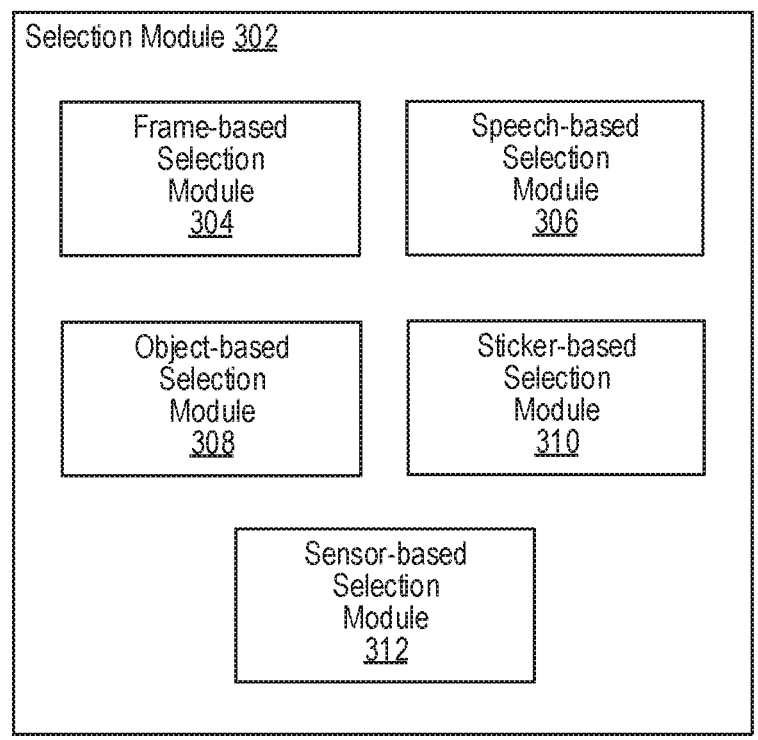
FIG. 3 illustrates an example selection module, according to an embodiment of the present disclosure.

FIG. 3 illustrates a selection module 302, according to an embodiment of the present disclosure. In some embodiments, the selection module 204 of FIG. 2 can be implemented with the selection module 302. As shown in the example of FIG. 3, the selection module 302 can include a frame-based selection module 304, a speech-based selection module 306, an object-based selection module 308, a sticker-based selection module 310, and a sensor-based selection module 312.

Figure 4A:
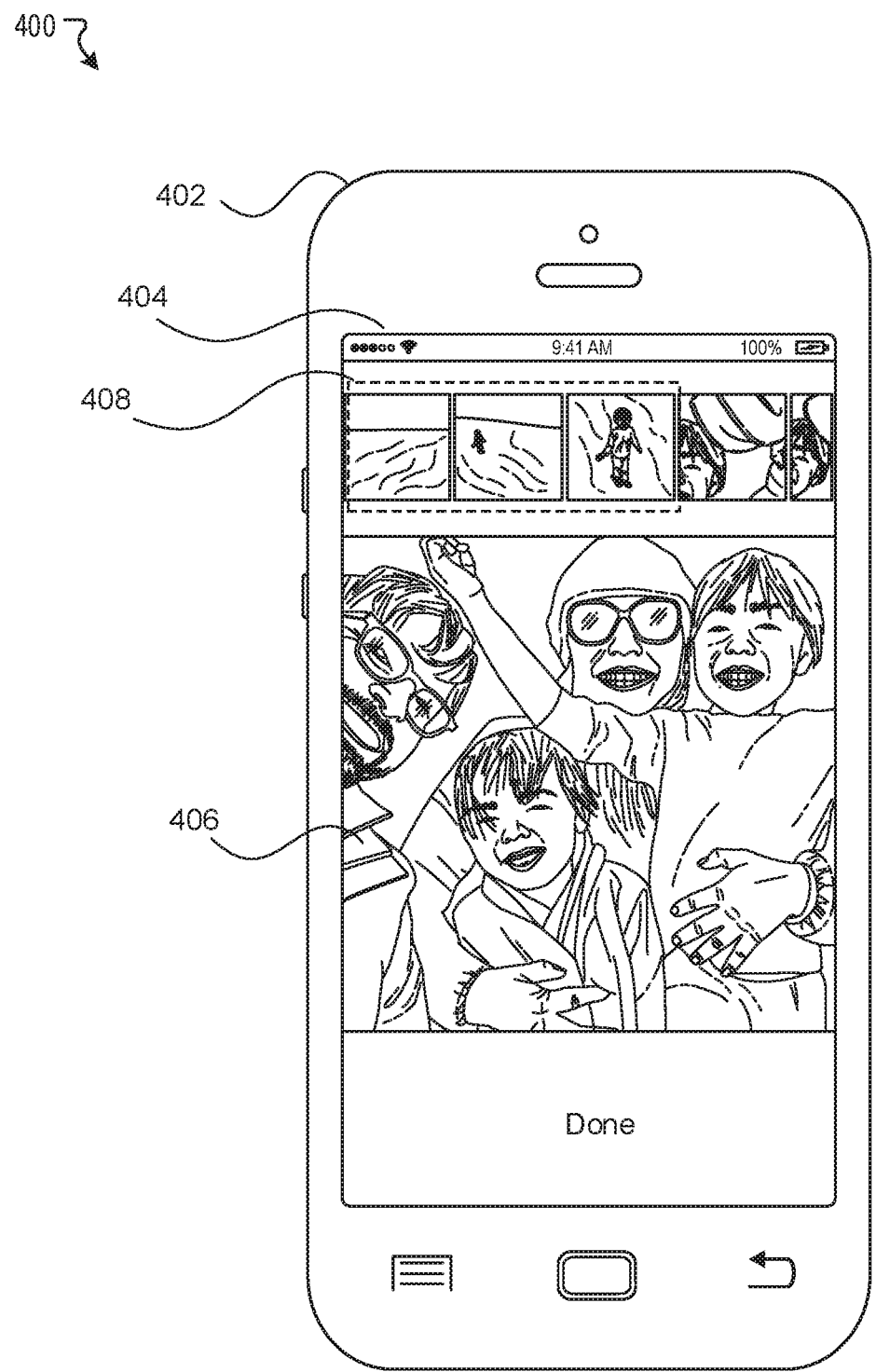
FIGS. 4A-4C illustrates example interfaces, according to an embodiment of the present disclosure.
Figure 4B:
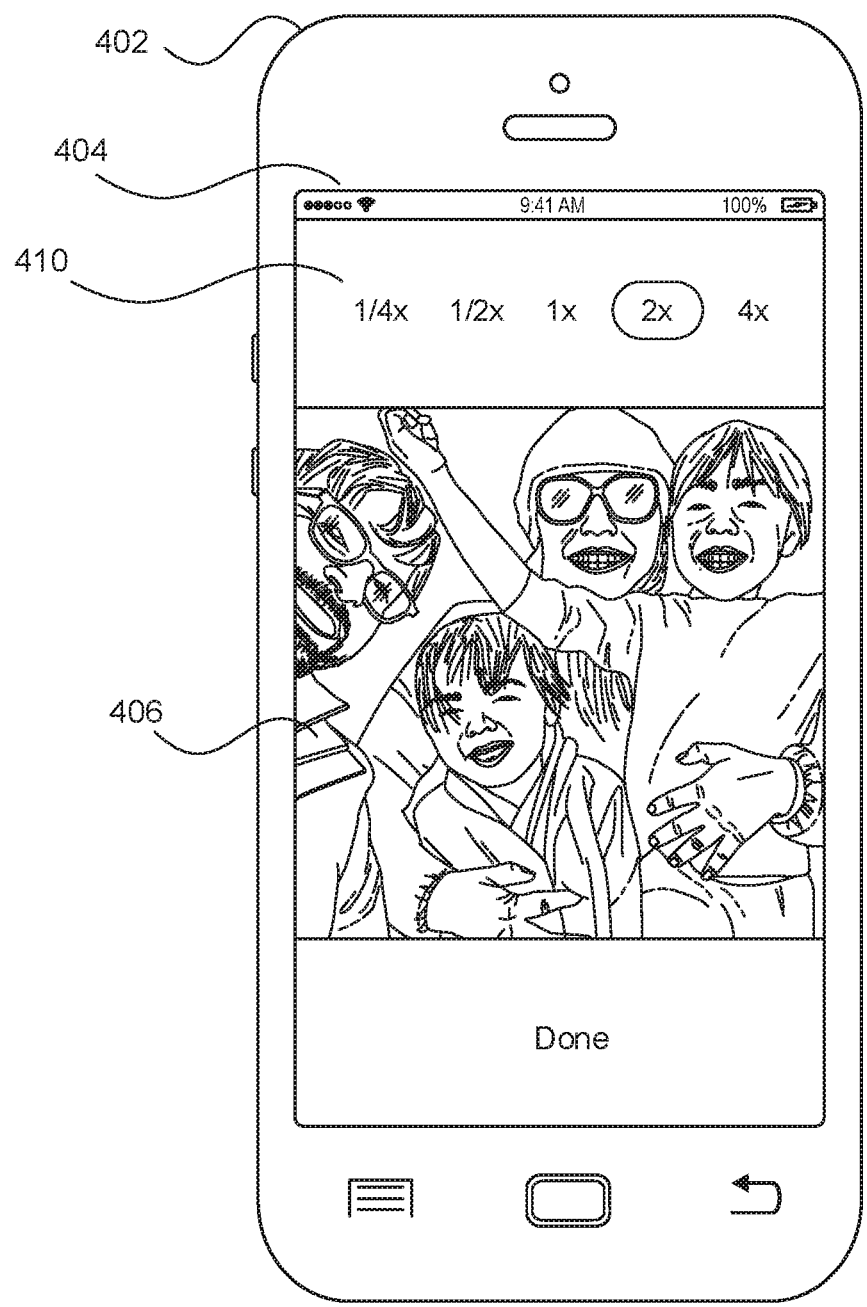

The selection module 302 can provide various options for identifying (or defining) portions of videos to be compressed (or not to be compressed). Such portions can be identified using various approaches. For example, in some embodiments, the frame-based selection module 304 can provide options for identifying a portion of a video as a set of frames. For example, a user can identify two or more frames of a video as one portion of the video that is subject to compression. Alternatively, the user can identify two or more frames of the video as a portion of the video that is not subject to compression. In general, such frames can be identified through an interface that is provided by a software application (e.g., a social networking application) running on a computing device, as illustrated in the example of FIG. 4A. In some embodiments, the frame-based selection module 304 can provide options for adjusting a playback speed corresponding to a selected set of frames. For example, the frame-based selection module 304 can provide options for decreasing a playback speed by some multiplier (e.g., ¼x, ½x, etc.) or for increasing the playback speed by some multiplier (e.g., 2x, 4x, etc.), as illustrated in the example of FIG. 4B.

In some embodiments, the speech-based selection module 306 can be configured to automatically identify portions of a video to be compressed (or not to be compressed) based on detected speech. For example, in some embodiments, the speech-based selection module 306 can evaluate audio corresponding to a video to identify portions of the video that contain speech (or voices). These identified portions can then be compressed (or not compressed). For example, in some embodiments, the speech-based selection module 306 can automatically compress portions of a video that do not contain human speech. In such embodiments, the speech-based selection module 306 can identify any portions of the video that contain human voices. The speech-based selection module 306 can then designate the remaining portions of the video for compression. In instances where speech is not important, the speech-based selection module 306 can automatically identify portions of a video that contain human speech and then designate those identified portions for compression. Many variations are possible. In general, the speech-based selection module 306 can implement any generally known speech detection technique including, for example, Hidden Markov Models and neural network models.

In some embodiments, the object-based selection module 308 can be configured to automatically identify portions of a video to be compressed (or not to be compressed) based on objects detected in subject matter captured by the video. For example, in some embodiments, the object-based selection module 308 can automatically compress portions of a video in which pre-defined objects (e.g., human faces) are not represented. In such embodiments, the object-based selection module 308 can identify portions of the video in which the pre-defined objects (e.g., human faces) are represented and then designate the remaining portions of the video for compression. Alternatively, in instances where pre-defined objects are not relevant, the object-based selection module 308 can designate portions in which the objects are represented for compression. Many variations are possible. In various embodiments, the object-based selection module 308 can analyze subject matter captured by videos using various generally known object detection techniques. For example, the object-based selection module 308 can implement a trained machine learning model (e.g., content classifier) to identify various objects represented in videos. In general, the machine learning model can be trained to recognize any type of object including, for example, human faces, individuals, activities, products, logos, animals, points of interest, or other concepts.

Figure 4C:
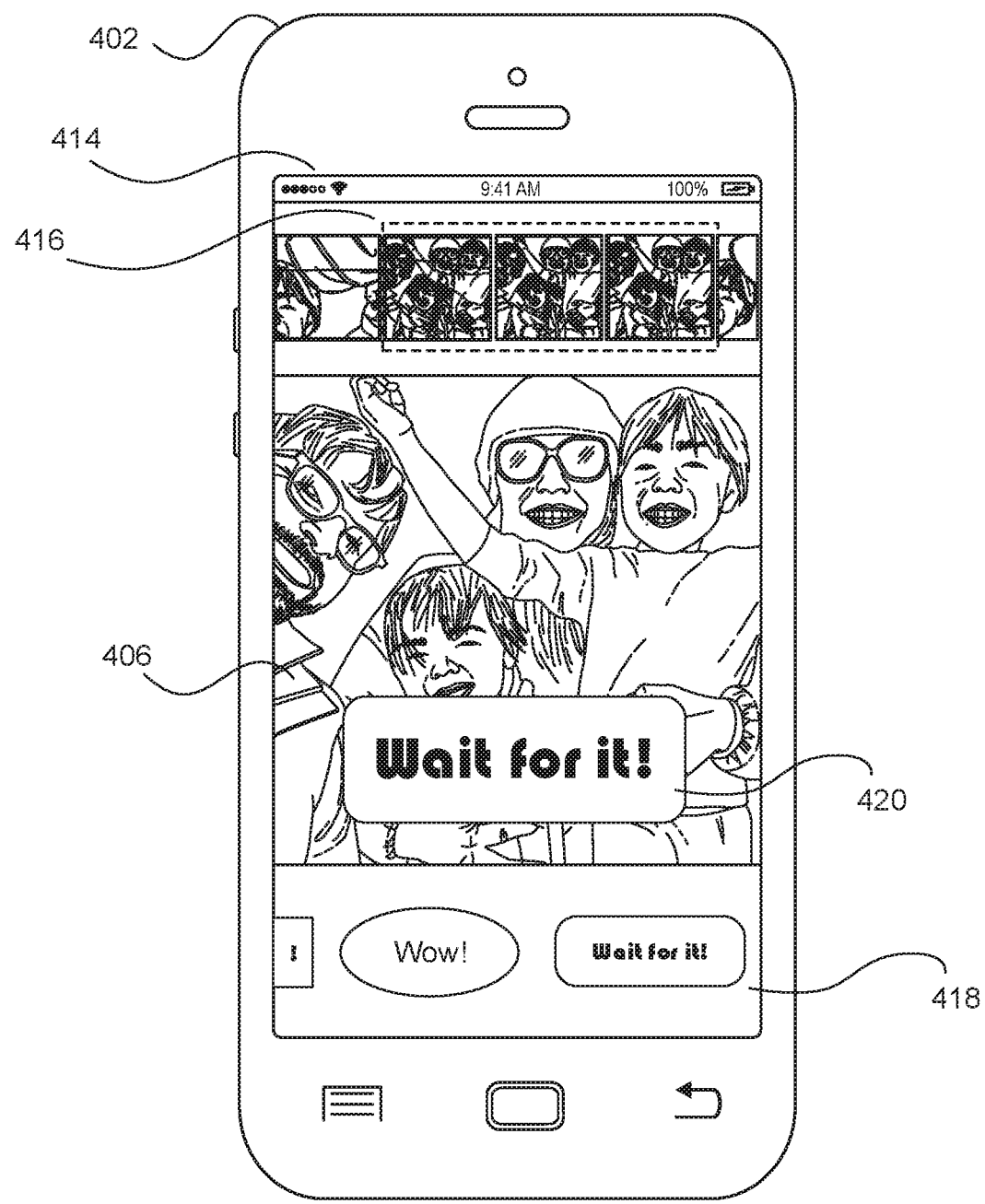

In some embodiments, the sticker-based selection module 310 can be used to identify portions of a video to be compressed (or not to be compressed) using virtual stickers. For example, the sticker-based selection module 310 can provide a set of virtual stickers (or graphical overlays) that can be inserted during playback of a video. In general, such virtual stickers can be accessible through an interface provided by a software application (e.g., a social networking application) running on a computing device, as illustrated in the example of FIG. 4C. In some embodiments, the sticker-based selection module 310 can provide a first type of virtual sticker that can be applied to identify portions of a video to be compressed. For example, a user may apply the first type of virtual sticker during playback of a given video. Once the virtual sticker is applied, the sticker-based selection module 310 can determine a portion of the video to which the virtual sticker was applied. In some embodiments, the portion can be defined based on a pre-defined range of time. For example, the portion can include video footage that precedes a frame in which the virtual sticker was applied by a threshold amount of time (e.g., 2 seconds) and video footage following the frame by a threshold amount of time (e.g., 2 seconds). In this example, the portion corresponds to some part of the video that spans a length of 4 seconds. Similarly, in some embodiments, the sticker-based selection module 310 can provide a second type of virtual sticker that can be applied to identify portions of the video that should not be compressed. Many variations are possible.

In some embodiments, virtual stickers can be applied to perform various visual operations. For example, in some embodiments, a virtual sticker can be applied to some portion of a video to increase a zoom level during playback of the portion. In another example, in some embodiments, a virtual sticker can be applied (or pinned) to an object in some portion of a video. In such embodiments, the virtual sticker can automatically be repositioned during playback of the video based on changes to the object's location. That is, the pinned virtual sticker can follow the object as the object moves during playback of the video. In some embodiments, virtual stickers applied to a video remain visible to users accessing that video. In such embodiments, the virtual stickers can serve as graphical overlays that include text, visual content, or a combination thereof. In various embodiments, applied virtual stickers can be dragged and positioned as desired, for example, by performing various touch screen gestures (e.g., drag gesture). In general, a user can select options to resize applied virtual stickers as desired, for example, by performing various touch screen gestures (e.g., pinch gesture). In some embodiments, the user can select an option to obtain, or download, different sets of virtual stickers that are available through the social networking system. In some embodiments, the user can select an option to purchase different sets of virtual stickers that are available through the social networking system.

The sensor-based selection module 312 can be configured to automatically identify portions of a video to be compressed (or not to be compressed) based on sensor data. For example, in some embodiments, the sensor-based selection module 312 can evaluate sensor data (e.g., accelerometer data, gyroscope data, etc.) determined by a computing device used to capture a given video. In some embodiments, portions of a video during which a computing device experienced a threshold amount of jitter or angular movement (e.g., shaky footage), as reflected by the sensor data, can automatically be compressed by the sensor-based selection module 312.

FIG. 4A illustrates an example 400 of an interface 404, according to an embodiment of the present disclosure. In this example, the interface 404 is presented through a display screen of a computing device 402. Further, the interface 404 may be provided through an application (e.g., a web browser, a social networking application, messenger application, etc.) running on the computing device 402 that is configured to interact with a social networking system. In the example of FIG. 4A, the interface 404 is presenting a media content item (e.g., video) 406 to be compressed. In various embodiments, the interface 404 provides options for selecting portions of the video 406 to be compressed (or not to be compressed). In the example of FIG. 4A, a user operating the computing device 402 can interact with the interface 404 to select a set of frames 408. The set of frames 408 may be selected using touchscreen gestures, for example. The user can then specify whether the selected frames 408 should be preserved (e.g., not compressed) or should not be preserved (e.g., compressed). For example, in some embodiments, the user can adjust a playback speed corresponding to the selected frames 408, as illustrated in FIG. 4B. In some embodiments, the interface 404 can provide options 410 for decreasing a playback speed by some rate (e.g., ¼x, ½x, etc.) or for increasing the playback speed by some rate (e.g., 2x, 4x, etc.) as illustrated in the example of FIG. 4B. Many variations are possible.

FIG. 4C illustrates an example interface 414 presented on the display screen of the computing device 402. In this example, the interface 414 includes a tray 418 from which virtual stickers can be selected and inserted into the video 406. These virtual stickers can be inserted to perform various operations such as compressing portions of the video or visually modifying portions of the video, as described above. In the example of FIG. 4C, the user operating the computing device 402 has associated a virtual sticker 420 with a set of selected frames 416. Here, the virtual sticker 420 is being used to designate frames to be compressed. As a result, the selected set of frames 416 can be compressed using any of the approaches described above. Many variations are possible.

Figure 5:
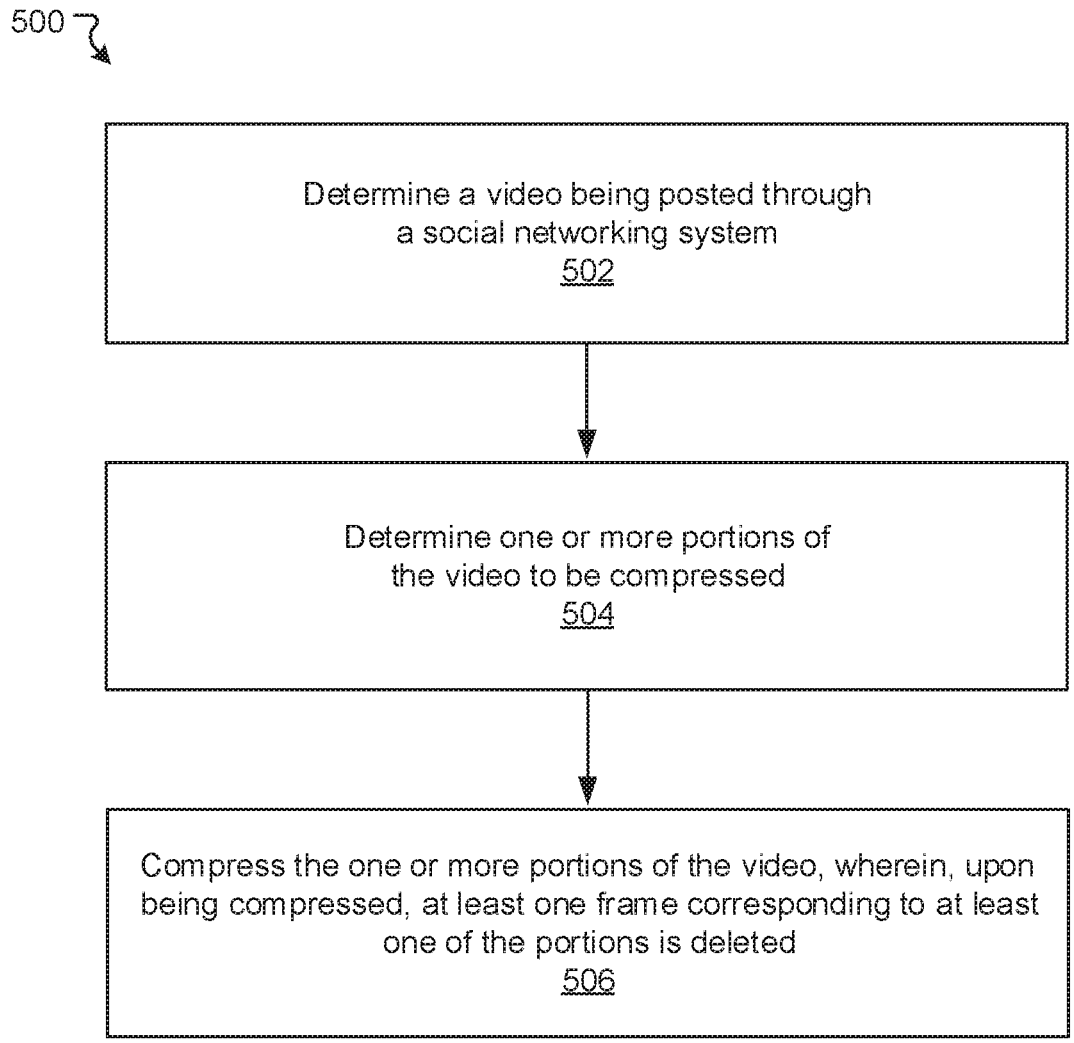
FIG. 5 illustrates an example method, according to an embodiment of the present disclosure.

FIG. 5 illustrates an example method 500, according to an embodiment of the present disclosure. It should be appreciated that there can be additional, fewer, or alternative steps performed in similar or alternative orders, or in parallel, within the scope of the various embodiments discussed herein unless otherwise stated.

At block 502, a video being posted through a social networking system can be determined. At block 504, one or more portions of the video to be compressed can be determined. At block 506, the one or more portions of the video can be compressed, wherein, upon being compressed, at least one frame corresponding to at least one of the portions is deleted.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
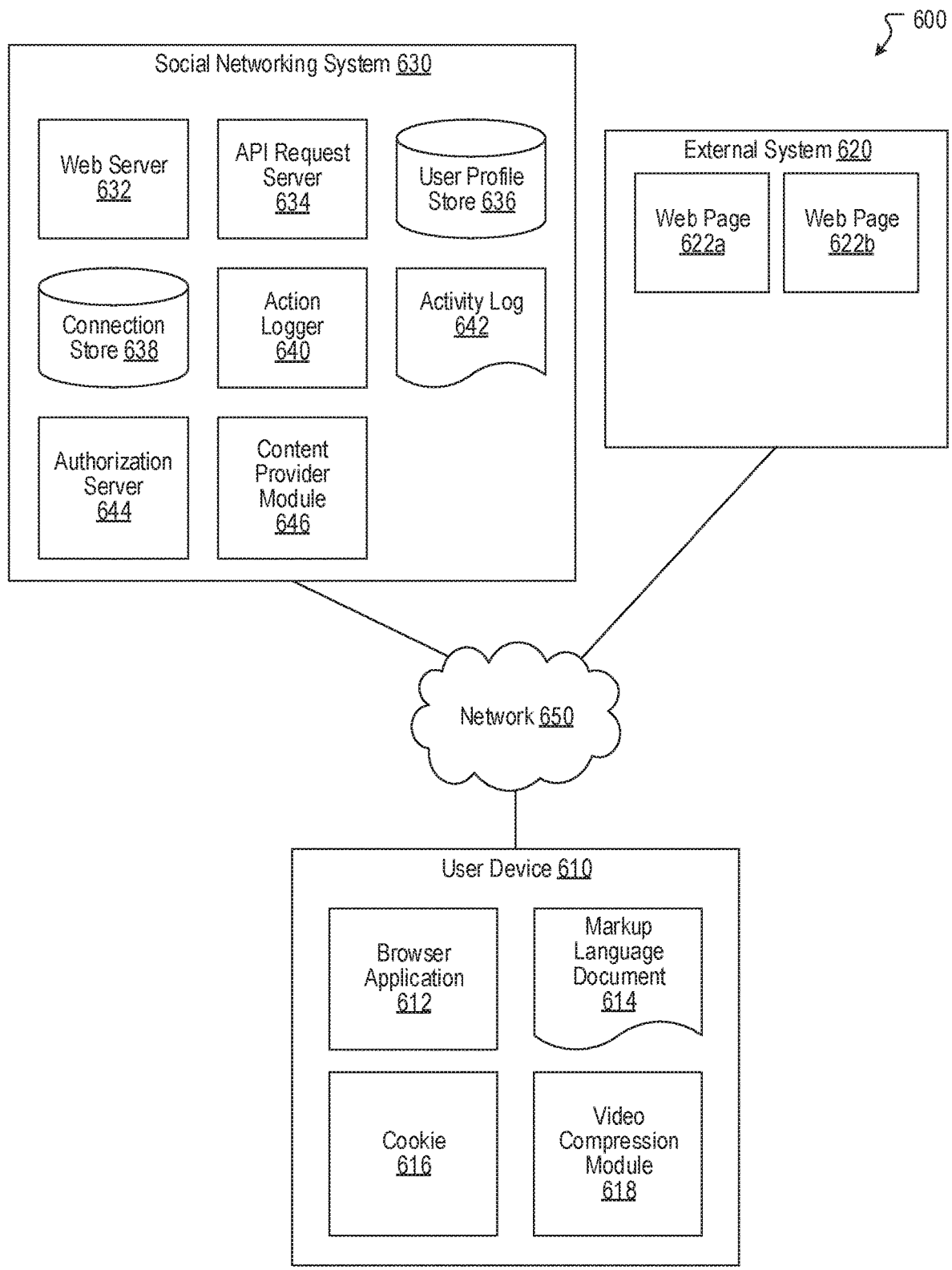
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices (or systems) that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622*a*, 622*b*, which are communicated to the user device 610 using the network 650. The external system 620 is separate from the social networking system 630. For example, the external system 620 is associated with a first domain, while the social networking system 630 is associated with a separate social networking domain. Web pages 622*a*, 622*b*, included in the external system 620, comprise markup language documents 614 identifying content and including instructions specifying formatting or presentation of the identified content. As discussed previously, it should be appreciated that there can be many variations or other possibilities.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels.

Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a content provider module 646. The content provider module 646 can, for example, be implemented as the content provider module 102 of FIG. 1. In some embodiments, a video compression module 618, in whole or in part, is implemented in the user device 610. The video compression module 618 can, for example, be implemented as the video compression module 112 of FIG. 1. As discussed previously, it should be appreciated that there can be many variations or other possibilities.

Hardware Implementation

Figure 7:
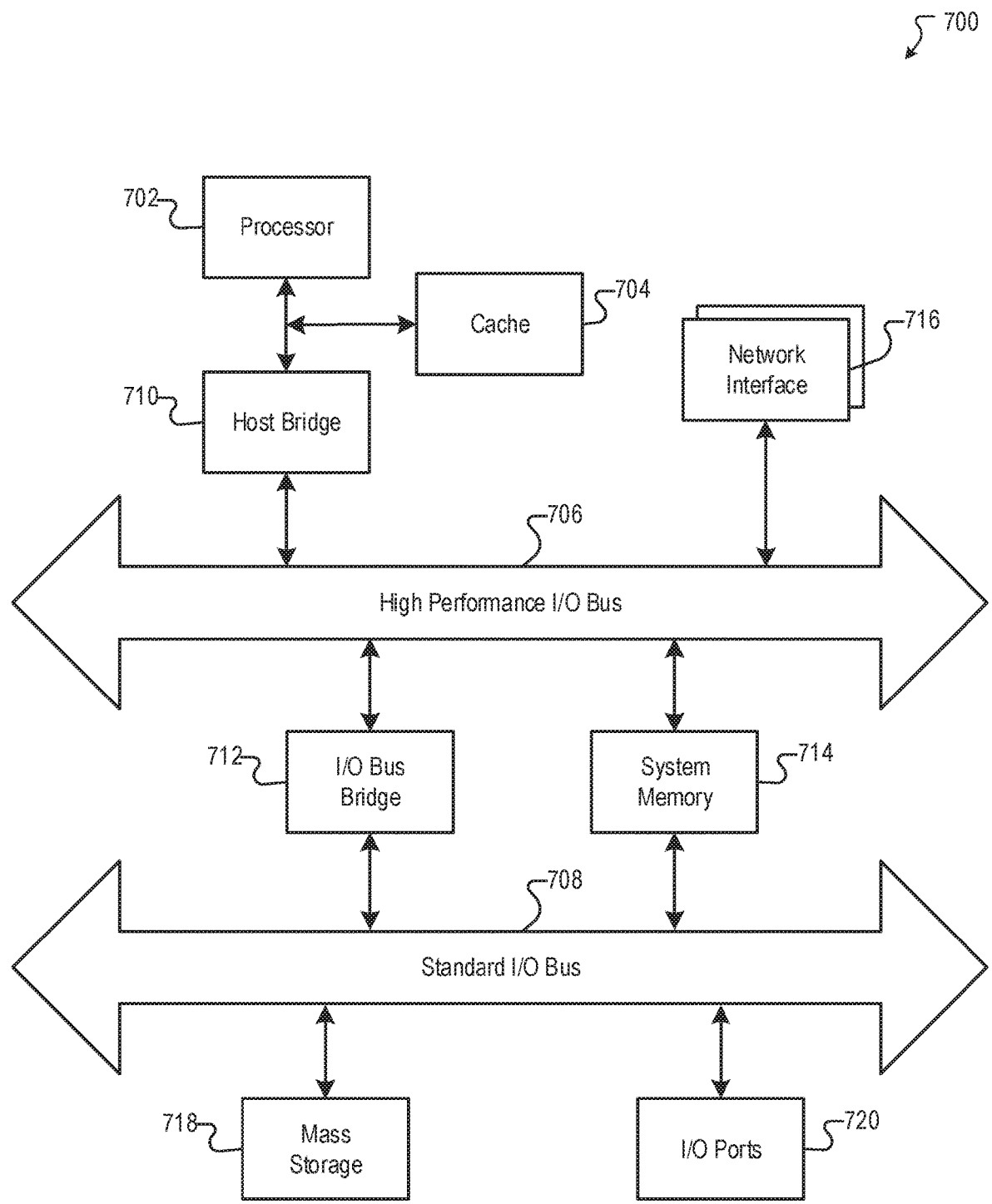
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   determining, by a computing system, a video being posted through a social networking system;
   determining, by the computing system, one or more portions of the video to be compressed; and
   compressing, by the computing system, the one or more portions of the video, wherein, upon being compressed, a playback speed corresponding to at least one of the portions is increased by some rate.

2. The computer-implemented method of claim 1, wherein the playback speed is increased based on a predefined multiplier.

3. The computer-implemented method of claim 1, wherein, upon being compressed, a respective playback length corresponding to the at least one of the portions is reduced in response to increasing the playback speed.

4. The computer-implemented method of claim 1, the method further comprising:
   determining, by the computing system, at least one remaining portion of the video that was not determined to be compressed; and
   maintaining, by the computing system, a playback speed corresponding to the at least one remaining portion of the video.

5. The computer-implemented method of claim 1, the method further comprising:
   determining, by the computing system, at least one remaining portion of the video that was not determined to be compressed; and
   causing, by the computing system, a playback speed corresponding to the at least one remaining portion of the video to decrease by some rate.

6. The computer-implemented method of claim 5, wherein a respective playback length corresponding to the at least one remaining portion is increased in response to decreasing the playback speed.

7. The computer-implemented method of claim 1, wherein determining the one or more portions of the video to be compressed further comprises:

determining, by the computing system, one or more portions of the video that contain audio determined to be human speech; and designating, by the computing system, one or more remaining portions of the video for compression.

8. The computer-implemented method of claim 1, wherein determining the one or more portions of the video to be compressed further comprises:

determining, by the computing system, one or more portions of the video that contain subject matter representing one or more pre-defined objects; and designating, by the computing system, one or more remaining portions of the video for compression.

9. The computer-implemented method of claim 1, wherein determining the one or more portions of the video to be compressed further comprises:

determining, by the computing system, at least one portion of the video in which at least one virtual sticker was inserted; and designating, by the computing system, the portion of the video for compression.

10. The computer-implemented method of claim 1, wherein determining the one or more portions of the video to be compressed further comprises:

determining, by the computing system, at least one portion of the video during which a threshold angular movement was detected; and designating, by the computing system, the portion of the video for compression.

11. A system comprising:

at least one processor; and a memory storing instructions that, when executed by the at least one processor, cause the system to perform:

determining a video being posted through a social networking system;

determining one or more portions of the video to be compressed; and compressing the one or more portions of the video, wherein, upon being compressed, a playback speed corresponding to at least one of the portions is increased by some rate.

12. The system of claim 11, wherein the playback speed is increased based on a pre-defined multiplier.

13. The system of claim 11, wherein, upon being compressed, a respective playback length corresponding to the at least one of the portions is reduced in response to increasing the playback speed.

14. The system of claim 11, wherein the instructions further cause the system to perform:

determining at least one remaining portion of the video that was not determined to be compressed; and maintaining a playback speed corresponding to the at least one remaining portion of the video.

15. The system of claim 11, wherein the instructions further cause the system to perform:

determining at least one remaining portion of the video that was not determined to be compressed; and causing a playback speed corresponding to the at least one remaining portion of the video to decrease by some rate.

16. A non-transitory computer-readable storage medium including instructions that, when executed by at least one processor of a computing system, cause the computing system to perform a method comprising:

determining a video being posted through a social networking system;

determining one or more portions of the video to be compressed; and compressing the one or more portions of the video, wherein, upon being compressed, a playback speed corresponding to at least one of the portions is increased by some rate.

17. The non-transitory computer-readable storage medium of claim 16, wherein the playback speed is increased based on a pre-defined multiplier.

18. The non-transitory computer-readable storage medium of claim 16, wherein, upon being compressed, a respective playback length corresponding to the at least one of the portions is reduced in response to increasing the playback speed.

19. The non-transitory computer-readable storage medium of claim 16, wherein the instructions further cause the computing system to perform:

determining at least one remaining portion of the video that was not determined to be compressed; and maintaining a playback speed corresponding to the at least one remaining portion of the video.

20. The non-transitory computer-readable storage medium of claim 16, wherein the instructions further cause the computing system to perform:

determining at least one remaining portion of the video that was not determined to be compressed; and causing a playback speed corresponding to the at least one remaining portion of the video to decrease by some rate.

* * * * *